Patented June 29, 1937

2,085,299

UNITED STATES PATENT OFFICE 2,085,299

PROCESSES FOR BREAKING PETROLEUM EMULSIONS

Melvin De Groote, St. Louis, and Arthur F. Wirtel, Kirkwood, Mo., assignors to Tretolite Company, Webster Groves, Mo., a corporation of Missouri No Drawing. Application September 18, 1936, Serial No. 101,434

6 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by our process consists of or comprises an alkylated naphthalene sulfonic acid in the form of a hydroxyalkyl-alkylamine salt of the kind in which at least one of the alkyl groups substituted in the naphthalene nucleus contains not less than three carbon atoms and not more than ten carbon atoms. Such products are nuclear substituted products.

Commercial demulsifying agents employed for breaking or resolving oil field emulsions include, among other substances, substituted polycyclic aromatic sulfonic acids, or their salts. The type which finds most frequent application is obtained by introducing one, two or more alkyl groups into a naphthalene residue and then producing the sulfonic acid, or the equivalent procedure of alkylating the sulfonic acids. Due to the corrosiveness of the sulfonic acid, it is the usual practice to employ the reagent in the form of a salt, such as ammonium salt, potassium salt, sodium salt, etc.

We have found that if the alkylated aromatic sulfonic acids of the kind previously described are neutralized by means of a hydroxyalkyl-alkylamine of the kind previously referred to and of the kind that will be hereinafter described in greater detail, one obtains a treating agent or demulsifying agent of unusual effectiveness.

It is known that glycerol mono-chlorhydrin may be reacted with mono-amylamine or di-amylamine to produce materials such as 1-monoamyl amino propane-2,3-diol or 1-di-amyl amino propane-2,3-diol (see U. S. Letters Patent No. 2,042,621, to Olin, dated June 2, 1936).

If glycerol mono-chlorhydrin is replaced by a mono-chlorhydrin derived from a glycol, for instance, ethylene glycol mono-chlorhydrin, propylene glycol mono-chlorhydrin, butylene glycol mono-chlorhydrin, amylene glycol mono-chlorhydrin, hexylene glycol mono-chlorhydrin, etc., one obtains products which are somewhat similar to the amyl amino propane derivatives previously mentioned, but are in fact, hydroxyalkyl-alkylamines. For the purposes of illustration, ethylene glycol chlorhydrin, commonly known as glycol (ethylene) chlorhydrin, will be employed. The most suitable compounds are derived from amylamines, and more particularly, from monoamylamine, although it is to be noted that any suitable aliphatic primary or secondary amine may be employed. The reaction may be illustrated as follows:

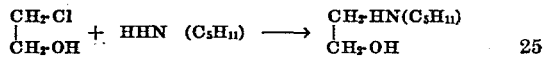

In the event that di-amylamine is employed, the resultant product would be:

The products so obtained may be either hydroxyalkyl-mono-alkylamines, or hydroxyalkyl-di-alkylamines.

Not only may reactions of the kind above referred to be employed to produce products or materials of the kind used as the demulsifying agent in our process, but one may also produce products or materials by reactions involving an alkylene oxide and a suitable primary or secondary amine. Ethylene oxide may react with mono-amylamine, as indicated by the following reaction:

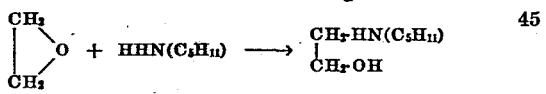

Similarly, when ethylene oxide is reacted with di-amylamine, the corresponding compound previously described, that is:

is formed. However, by either the reaction involving chlorhydrin or by the reaction involving the alkylene oxide, two molecules of the oxide or the chlorhydrin can be united with one molecule of the primary amine, so as to give a di-hydroxy di-ethyl mono-alkylamine, as indicated by the following reactions:

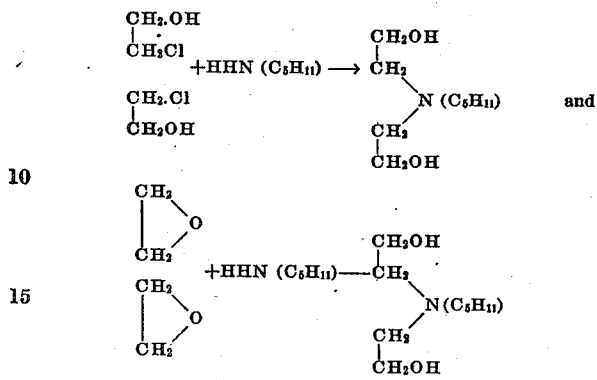

The present process employs alkylated naphthalene sulfonic acids which have been neutralized by hydroxyalkyl-alkylamines of the kind previously described, and which may be indicated by the following formula:

$$[OH(T)]_m H_{m'} N(B)_{m''}$$

in which T is an alkylene radical of the conventional formula type $C_nH_{2n}$, B is an alkyl radical having two or more carbon atoms, $m$ represents the numeral one or two, $m'$ represents the numeral zero or one, and $m''$ represents the numeral one or two, with the proviso that $m$ plus $m'$ plus $m''$ equals three.

As previously pointed out, glycols or alkylene glycols are characterized by the formula $C_nH_{2n}(OH)_2$ and include ethylene glycol, butylene glycol, propylene glycol, amylene glycol, hexylene glycol, etc. In some instances, the glycols may exist in isomeric forms, and it is intended that all isomeric forms be included, because one form is just as suitable as another. Propylene glycol is just as suitable as trimethylene glycol. Other glycols suitable for use include heptamethylene glycol, momomethylene glycol, decamethylene glycol, undecamethylene glycol, tridecamethylene glycol, tetradecamethylene glycol, and octadecamethylene glycol.

In the illustration referred to previously, reference has been made to mono-amylamine and di-amylamine, since this alkylamine is available in the open market at the lowest price. Any other suitable alkylamine, and preferably, alkylamines having at least four carbon atoms and not more than eight carbon atoms, are equally suitable. It is known, of course, that the various primary and secondary amines may occur in more than one isomeric form. For instance, the expression "alkylamine" is not intended to differentiate between isomeric forms, as, for example, an amylamine where the alkyl group may have a straight chain form or a branched form. Primary and secondary butylamine, amylamine, hexylamine, heptylamine and octylamine appear to be the most satisfactory amines for reaction with the alkylene oxides or glycol chlorhydrins.

Piperidine (hexahydro-pyridine) is not a true aliphatic amine from the strictest structural standpoint, but is comonly recognized as having the properties of an aliphatic amine. Hence, it is intended that piperidine be included in the broad classification of alkylamines. Smith, A Textbook of Organic Chemistry, 1932, second edition, revised, p. 646, states as follows: "Whereas, pyridine is a weak tertiary base of aromatic character, piperidine is a strong secondary base, the entire behavior of which classifies it with the aliphatic amines."

There does not appear to be any suitable explanation of the unusual superiority of the demulsifying agent employed in the present process, and similarly, there does not seem to be any basis by which one could anticipate or foresee this unusual effectiveness. Apparently, this marked improvement is not directly related to oil or water solubility, insofar that similar neutralization with other amines may yield compounds which have a greater solubility in oily materials or in water, and yet are not nearly as suitable and not nearly as effective in their demulsifying action.

Apparently, there is some unlooked-for cooperation or chemical or physico-chemical relationship between hydroxyalkyl-alkylamine residue and the sulfo-aromatic residue. The neutralization of other conventional acidic demulsifying reagents with hydroxyalkyl-alkylamines does not seem to produce any marked improvement over the corresponding sodium or ammonium salts, and in many cases, yields an inferior product, thus indicating that apparently the increased value does not reside in an additive effect, due to the hydroxyalkyl-alkylamine residue. If one neutralizes other sulfonic acids, which are known to be effective demulsifying agents, such as petroleum sulfonic acids of the mahogany acid type, with a hydroxyalkyl-alkylamine, one does not obtain a more effective demulsifying agent, and indeed, one is more likely to obtain a demulsifying agent which is less effective. Based on the results of actual tests obtained in a variety of emulsified crudes occurring in a number of the major oil fields of the United States, the conclusion one must inevitably reach is, that the result obtained by uniting the two residues, i. e., the hydroxyalkyl-alkylamine residue and the described sulfo-aromatic residue in a single molecule, results in an unlooked for, unique quality, which could not be foreseen by the present knowledge of the art, and which produces a demulsifying agent that is particularly effective for a large number of emulsified crude oils.

Alkylated naphthalene sulfonic acids are produced commercially, and the salts are used for a variety of purposes. They are generally produced from naphthalene, because there does not appear to be any advantage in the use of a naphthalene derivative, such as chlor-naphthalene, alpha and beta naphthol, etc. In other words, one could introduce the sulfonic acid residue and the alkyl residues into a substituted naphthalene, such as chlor-naphthalene, etc., just as readily perhaps as in the case of naphthalene. Such simple derivatives, of course, are the chemical equivalent of naphthalene in the manufacture of such sulfonic acids as are employed in the manufacture of the present reagent. It is understood that the word "naphthalene" is hereinafter employed to include these derivatives.

The general process of manufacturing the demulsifying agent contemplated by our process, consists in converting the naphthalene into either the alpha or beta naphthalene sulfonic acid, or a mixture of the two, or in some instances, into a di-, or even a tri-sulfonic acid, or a mixture of the various types. In most instances there is no advantage in introducing more than one sulfonic acid residue. In many instances it is unnecessary to use particular care to prepare either only the alpha sulfonic acid, or either only the beta sulfonic acid, because a mixture in which either one or the other predominates, or a mixture in which the alpha and beta sulfonic acids are present in approximately equal amounts, is just as satisfactory as one sulfonic acid completely freed from the other type.

The alcohol employed, such as various propyl alcohol, butyl alcohols, amyl alcohols, hexyl alcohols, decyl alcohols, etc. is converted into the acid sulfate, such as propyl hydrogen sulfate. The naphthalene sulfonic acid and the alkyl hydrogen sulfate are combined in proportions so that one, two, three, or even four alkyl groups are introduced into the aromatic residue. This condensation reaction is generally carried out in the presence of an excess of sulfuric acid. In some instances, the various reactions, such as sulfonation, sulfation, condensation, etc. are carried out simultaneously. Generally speaking, the di-alkylated and tri-alkylated material appear to yield the most desirable type of reagent. The presence of some mono-alkylated material, or some tetra-alkylated material is not objectionable, and may even be desirable.

It is obvious, of course, that the alkylated groups introduced might be derived from olefines, such as butylene, propylene, amylene, etc., insofar that such olefines react directly with sulfuric acid, to produce the alkyl hydrogen sulfates. Of course, in addition to introducing such alkyl residues of the kind described into the aromatic nucleus, one could also introduce an alkyl residue from some other alcohol, as, for example, an alkylated group derived from ethyl or methyl alcohol, or one might introduce a group derived from an aryl, aralkyl, hydro-aromatic, or cyclo alcohol, but regardless of whether or not one introduces such other residues, it is necessary that at least one alkyl residue of the kind described, i. e., having at least three carbon atoms and not more than ten carbon atoms, be introduced into the naphthalene ring. Such compounds having some other residue present, such as methyl residue, might be considered as being derived from methyl naphthalene, instead of naphthalene, and thus, would fall within the class of chemical equivalents previously noted. It is immaterial as to the particular alcohol employed, or the particular isomeric form of the alcohol employed, although generally speaking, it is most desirable to use the one lowest in cost. It is immaterial whether one uses normal propyl alcohol or isopropyl alcohol. It is immaterial whether one uses a normal butyl or isobutyl alcohol. It is immaterial whether the alcohol be a primary alcohol, or a secondary alcohol, or a tertiary alcohol, or the like.

It is obvious that a large number of isomers can be produced in the manufacture of the material employed as the demulsifying agent in the present process. For instance, although the sulfonic group may be introduced into either the alpha or beta position, it is manifest that the alkyl group or groups can be introduced into various positions in regard to the position of the sulfonic acid residue. Apparently, as far as we are aware, one isomeric form is as effective as the other. Reference to the compounds is not intended to indicate any particular isomer, unless the text clearly indicates some specific position.

Insofar that the most readily available alcohols, from the standpoint of cost, are isopropyl alcohol, normal butyl alcohol, isobutyl alcohol, and amyl alcohol; it is our preference to produce our demulsifying agent from these alcohols, and in some instances, it is desirable to introduce different alkyl groups, such as a propyl group and butyl group, into the same sulfo-naphthalene residue.

In the actual manufacture of alkylated naphthalene sulfonic acids, the completion of the desired chemical reactions is followed by a washing process which removes the excess of sulfuric acid or other sulfonation, sulfation, or condensation reagent employed. The acidic mass thus obtained is neutralized with a hydroxyalkyl-alkylamine in the same manner than sodium or potassium or ammonium hydroxides might usually be employed. The final product, if it represents a pasty or semi-solid or a solid mass, is rendered suitable for industrial use by the addition of a solvent, such as water, an alcohol, a coal tar product, a petroleum hydrocarbon solvent, or in any similar manner.

The demulsifying agent that we prefer to use in practising our process is obtained by a reaction in which three molecules of isopropyl alcohol are united with one molecule of naphthalene by the customary sulfation, sulfonation and condensation reactions. The resulting mixture consists largely of di-propyl naphthalene sulfonic acids and tri-propyl naphthalene sulfonic acids, with possibly small amounts of mono-propyl sulfonic acids and tetrapropyl sulfonic acids present. Generally speaking, it is easier to conduct the reaction so that the bulk of the sulfonic acid represents the beta type, although the alpha type may be produced, if desired. The product is neutralized with hydroxyethyl-amylamine derived by reaction between ethylene glycol chlorhydrin and mono-amylamine, and may consist of a mixture of mono-hydroxyethyl-amylamine, and di-hydroxy di-ethyl-amylamine. The product so obtained is diluted with one or more solvents, so as to reduce its viscosity to that of ordinary castor oil, or slightly greater. The solvents which we preferably employ are a mixture of two or more of the following: Water, denatured alcohol, kerosene, or tar acid oil.

Among the reagents which are particularly effective are the hydroxyalkyl-alkylamine salts of the following alkylated naphthalene sulfonic acids, i. e., mono-isopropyl naphthalene sulfonic acids, di-isopropyl naphthalene sulfonic acids, tri-isopropyl naphthalene sulfonic acids, mono-normal butyl naphthalene sulfonic acids, di-normal butyl naphthalene sulfonic acids, mono-isobutyl naphthalene sulfonic acids, di-isobutyl naphthalene sulfonic acids, mono-amyl naphthalene sulfonic acids, di-amyl naphthalene sulfonic acids, tri-amyl naphthalene sulfonic acids, mono-hexyl naphthalene sulfonic acids, di-hexyl naphthalene sulfonic acids, tri-hexyl naphthalene sulfonic acids, mono-octyl naphthalene sulfonic acids, di-octyl naphthalene sulfonic acids, mono-decyl naphthalene sulfonic acids, di-decyl naphthalene sulfonic acids, mono-isopropyl di-normal butyl naphthalene sulfonic acids, mono-isopropyl mono-hexyl naphthalene sulfonic acids, etc.

It may be desirable to indicate that there is sometimes some variation in nomenclature in regard to the salts derived from strong acids and various amines. For instance, the combination of aniline, and hydrochloric acid, is often referred to as aniline hydrochloride. When aniline hydrochloride is treated with caustic soda, aniline is regenerated and sodium chloride is formed. For this reason, and perhaps for other reasons, structural conditions are best expressed by referring to the compound as a hydrochloride, in order to indicate that one does not obtain the chloride of a quaternary ammonium compound. Similarly, the reaction of a hydroxyalkyl-alkylamine with a sulfonic acid may be considered as producing the hydroxyalkyl-alkylamine salt, although for reasons pointed out, such salt might be looked upon as a hydroxyalkyl-alkylamine hydrogen sulfonate, as well as being considered as a hydroxyalkyl-alkylamine sulfonate. Insofar that it is perfectly clear as to the chemical composition of the compound, it is immaterial which nomenclature is employed.

In such instances where there is present more than one sulfonic acid residue, as in the formation of a di-sulfonic acid, or a tri-sulfonic acid, or even a tetra-sulfonic acid, if desired, all the sulfonic acid hydrogen may be neutralized with hydroxyalkyl-alkylamine, and the other sulfonic hydrogen atom or atoms may be neutralized with some other suitable base, such as sodium hydroxide, potassium hydroxide, ammonium hydroxide, etc.

Hydroxyalkyl-alkylamine salts, such as the hydrochloride, may react by double decomposition with alkali sulfonates in a suitable medium to produce the hydroxyalkyl-alkylamine sulfonate.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohols, butyl alcohols, hexyl alcohols, octyl alcohols, etc., may be employed as diluents. Miscellaneous solvents, such as pine oil, carbon tretrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, in which the sulfonic hydrogen is neutralized by the use of some base other than hydroxyalkyl-alkylamine.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the conventration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

Having thus described our invention, what we claim as new and desire to secure by Letters Patent is:

1. A process for breaking petroleum emulsions of the water-in-oil type, which consists in subjecting the emulsion to the action of a demulsifying agent comprising a hydroxy-alkyl-alkylamine salt of an alkylated naphthalene sulfonic acid, in which at least one alkyl group substituted in the naphthalene nucleus contains at least three carbon atoms and not more than ten carbon atoms.

2. A process for breaking petroleum emulsions of the water-in-oil type, which consists in subjecting the emulsion to the action of a demulsifying agent comprising a compound of the formula type:

$$[OH(T)]_m H_{m'} N(B)_{m''} \cdot H \cdot D(SO_3)_{m'''}$$

in which T is an alkylene radical of the conventional formula type $C_n H_{2n}$, B is an alkyl radical having two or more carbon atoms, $m$ represents the numeral one or two, $m'$ represents the numeral zero or one, $m''$ represents the numeral one or two, with the proviso that $m$ plus $m'$ plus $m''$ equals three; $D(SO_3)_{m'''}$ is an alkylated naphthalene sulfonic acid residue in which at least one alkyl group substituted in the naphthalene nucleus contains at least three carbon atoms, and $m'''$ represents the numeral one, two or three.

3. A process for breaking petroleum emulsions of the water-in-oil type, which consists in subjecting the emulsion to the action of a demulsifying agent comprising a hydroxyalkyl-alkylamine salt of a butylated naphthalene sulfonic acid.

4. A process for breaking petroleum emulsions of the water-in-oil type, which consists in subjecting the emulsion to the action of a demulsifying agent comprising a hydroxyalkyl-alkylamine salt of an amylated naphthalene sulfonic acid.

5. A process for breaking petroleum emulsions of the water-in-oil type, which consists in subjecting the emulsion to the action of a demulsifying agent comprising a hydroxyalkyl-alkylamine salt of a propylated naphthalene sulfonic acid.

6. A process for breaking petroleum emulsions of the water-in-oil type, which consists in subjecting the emulsion to the action of a demulsifying agent obtained or produced by converting naphthalene into the monosulfonic acid; converting propyl alcohol into the acid sulfate; combining said materials in molecular proportions in presence of sulfuric acid as a condensing agent; followed by the conventional washing process and separation of the aqueous waste acid and neutralization of the sulfonic acid by means of hydroxy-ethyl-amylamine, followed by addition of a suitable solvent.

MELVIN DE GROOTE.
ARTHUR F. WIRTEL.